(12) United States Patent
Rabb et al.

(10) Patent No.: US 6,189,113 B1
(45) Date of Patent: Feb. 13, 2001

(54) AUDITRON DATA FORMAT FOR REMOTE MAINTENANCE OF A MACHINE SUCH AS A COPIER

(75) Inventors: Khalid M. Rabb, Fairport; John W. Daughton, Rochester, both of NY (US)

(73) Assignee: Xerox Corporation, Stamford, CT (US)

(*) Notice: Under 35 U.S.C. 154(b), the term of this patent shall be extended for 0 days.

(21) Appl. No.: 09/160,682

(22) Filed: Sep. 25, 1998

(51) Int. Cl.⁷ ............................. G06F 3/00; G06F 11/00
(52) U.S. Cl. ................................. 714/20; 714/15
(58) Field of Search ..................... 714/20, 25, 15, 714/47; 703/21; 707/101, 503; 702/184; 708/173; 710/65; 358/406; 399/8, 9; 341/173

(56) References Cited

U.S. PATENT DOCUMENTS

| | | |
|---|---|---|
| Re. 32,253 | * 9/1986 | Bartulis et al. . |
| 4,586,147 | * 4/1986 | Tadokoro . |
| 5,214,772 | 5/1993 | Weinberger et al. ................ 395/575 |
| 5,461,488 | * 10/1995 | Witek . |

* cited by examiner

Primary Examiner—Gopal C. Ray
(74) Attorney, Agent, or Firm—R. Hutter

(57) ABSTRACT

Electronically-rendered auditron data, such as from a copier or printer, is formatted with an initial structured portion followed by an unstructured portion. A code within the structured portion instructs a downstream computer how to interpret the digits in the unstructured portion of the data, so that different sets of digits within the unstructured portion are converted to discrete numbers having assigned meanings. The resulting numbers and their assigned meanings can be readily ported to a commercial spreadsheet program.

5 Claims, 2 Drawing Sheets

AUDITRON DATA FORMAT FOR REMOTE MAINTENANCE OF A MACHINE SUCH AS A COPIER

FIELD OF THE INVENTION

The present invention relates to software for communication with a machine, such as a copier or printer, enabling remote status inquires and maintenance of the machine.

BACKGROUND OF THE INVENTION

With the increasing sophistication of office equipment, such as digital copiers, printers, facsimiles, as well as devices which combine many of these functions, individual devices become more and more software intensive. Much of the functionality associated with a particular device dwells in the software of the device, and functionalities of a device can be monitored, improved or increased via the machine software. Preferably, such software access could be performed, for example, by a tech rep attending the device and plugging in a personal computer or laptop into the device for direct access to or downloading of software; or, the software could be accessed or installed in a device remotely, over a network.

It is known in the art for a printer or copier to make available what is often known as "auditron" data. In its most basic sense, such data would include a running count of how many prints or copies have been output by a particular machine since a previous check. Auditron data could conceivably further include more sophisticated metrics such as average number of prints output per day, or a number relating to an amount of makring material in the machine, or a list of codes relating to specific physical conditions within the machine, such as high temperatures.

In a real-world context, electronically-rendered auditron data is often displayed to user or tech rep in the form of a "data dump," which can be in the form of a set of numbers downloaded, for example, to the tech rep's laptop computer, or even printed out by the machine itself. One problem that has been found with these basic methods of outputting auditron data is that the data is not in a ready form for further processing. Typically the tech rep will read the data dump, have to know which number in the data dump means what, and write down or type in the numbers manually. It would be more convenient and efficient if a copier or printer could download its auditron data in a form which can be ported directly to a commerically-available software program, such as a spreadsheet program. In this way auditron data having many different parameters, and from many different machines, can be automatically compiled into a system-wide report.

DESCRIPTION OF THE PRIOR ART

U.S. Pat. No. 5,214,772 shows a system for collection of auditron-type data from a plurality of printers or copiers on a network.

SUMMARY OF THE INVENTION

According to one aspect of the present invention, there is provided a method of collecting auditron data from a machine. The machine outputs auditron data in a format including a structured portion in which digits therein are assigned meanings depending on their position relative to a beginning of the auditron data, and an unstructured portion. The structured portion includes a code therein. The code is interpreted as an instruction to parse digits in the unstructured portion in a predetermined manner, thereby interpreting the digits in the unstructured portion as a set of discrete numbers. The discrete numbers are entered into a template, thereby assigning meanings to each of the discrete numbers.

DETAILED DESCRIPTION OF THE INVENTION

Figure 1:
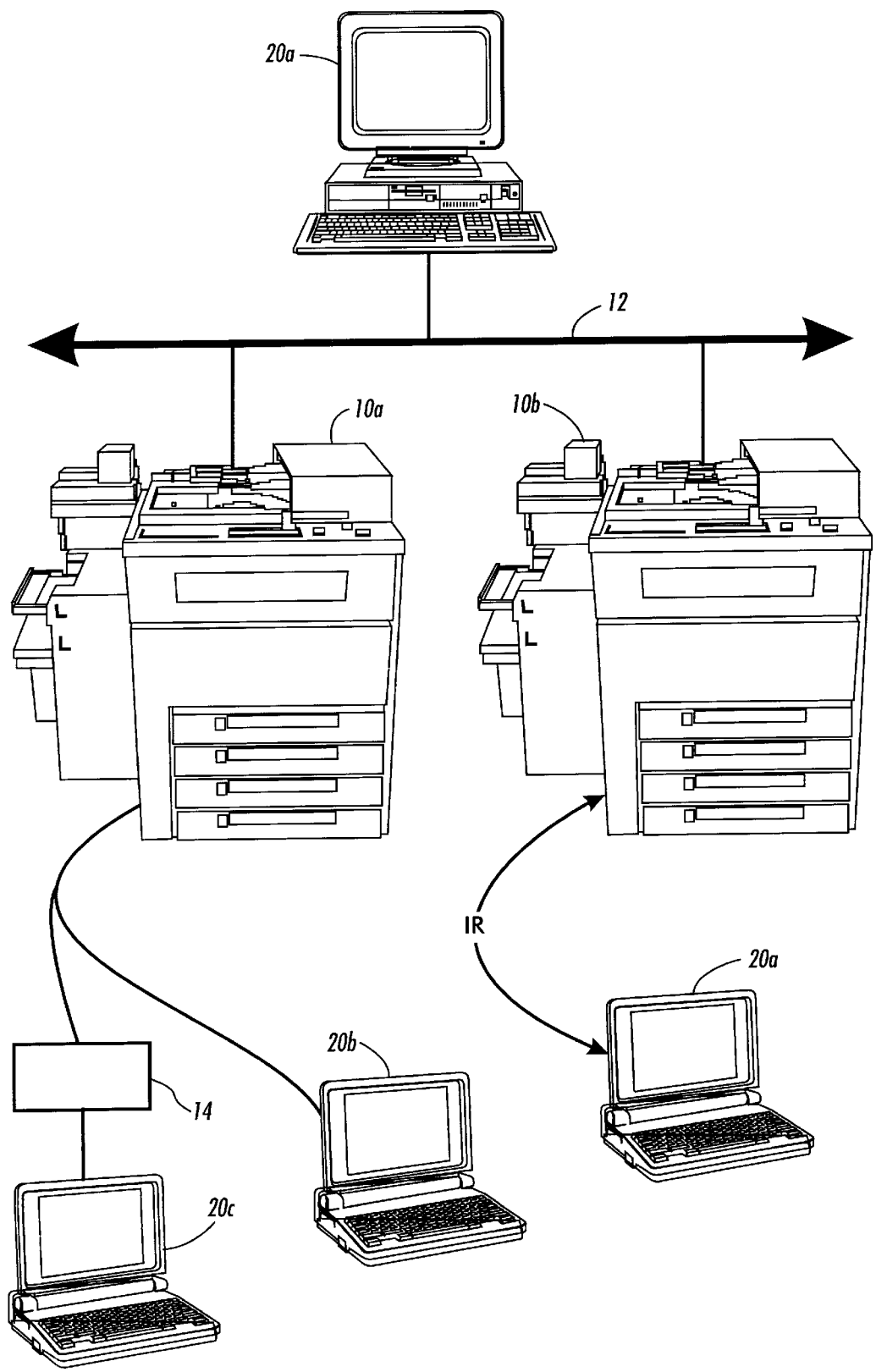
FIG. 1 is a simplified systems diagram showing various techniques for accessing machine-based software for purposes of remote repair, diagnostics, and maintenance.

FIG. 1 is a simplified diagram showing how a number of reasonably complex machines, in this case digital copiers 10a, 10b, can be accessed in various ways while they are being used by customers. In brief, machines such as digital copiers include a great deal of internal software for operation of the electromechanical systems therein. This internal software can be accessed in various ways, such as to detect failures, determine when regular maintenance is necessary, and even to alter the operation of the machine remotely.

Typically, in the context of office equipment, there are any number of ways in which the internal software of a machine such as 10a, 10b could be accessed. As most digital printing equipment is based on a network, the machine could give access to its internal software through a network 12 which connects to any one of a number of computers such as 20a, which may be located anywhere in the world. A customer service engineer (CSE) or "tech rep" can come out the customer site and directly couple his laptop computer, such as 20b, directly to a port in the machine 10a, or a computer such as 20c can interface with the machine 10a through a modem 14, using telephone lines. Alternately, a tech rep can access a suitably-equipped machine such as 10b with an infrared (IR) communication link, as shown.

Figure 2:
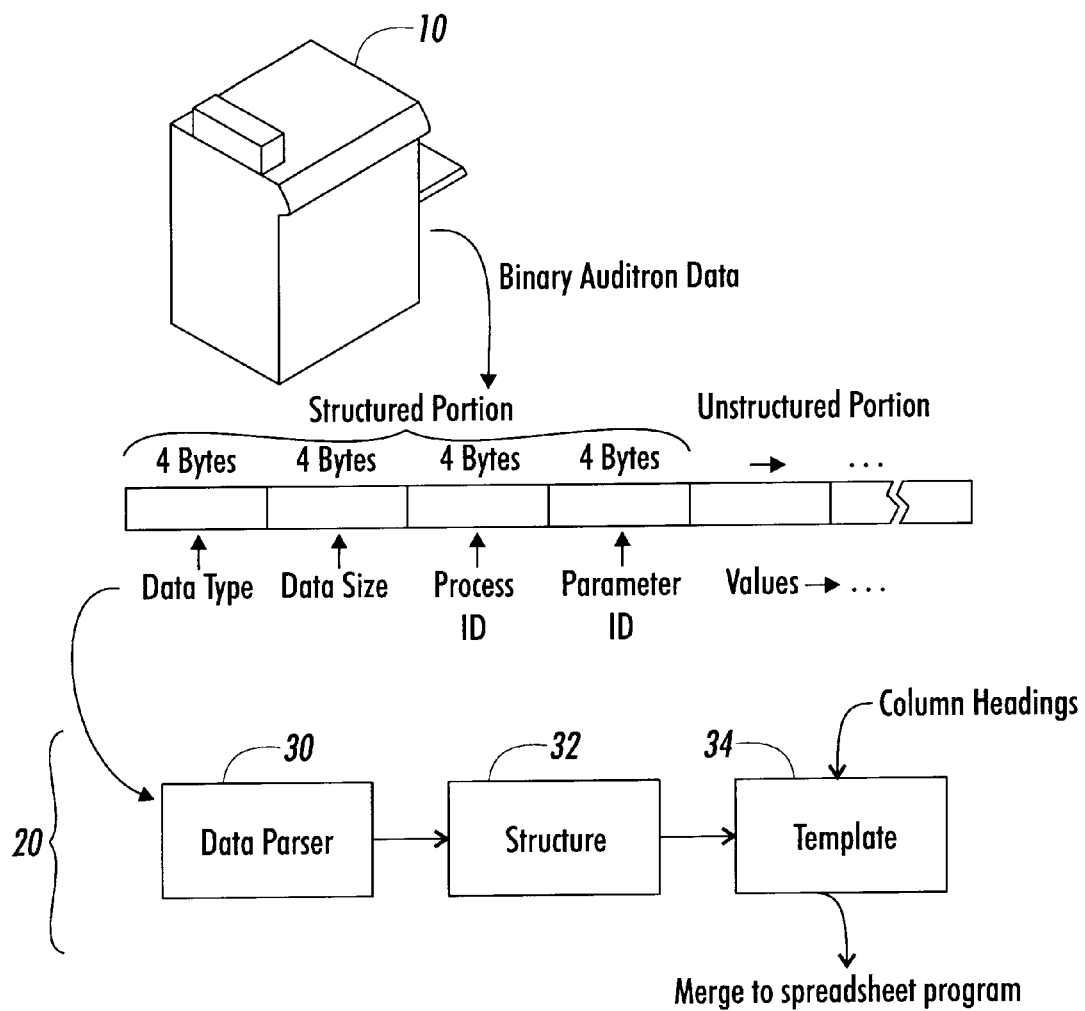
FIG. 2 is a diagram showing the function of the software for processing auditron data according to the present invention.

FIG. 2 is a diagram which shows how data from a machine 10, which shall hereinafter be referred to as "auditron" data, can be output in a fixed but flexible format, and how this auditron data can be processed, such as by a computer 20, for merging to a standard design spreadsheet program such as Microsoft® Excel™. Typical examples of auditron data which would be downloaded from time to time by a particular machine on network include values relating to: an account number; a PIN number (which is used for comparison to an input PIN to give access to the user); a print limit or the machine, or for a module within the machine; the machine serial number; a number relating to what subset of all possible values a particular user is allowed access to; and the time of the downloading of particular auditron data. For purposes of the claims hereinbelow, "auditron data" is defined as data, ultimately originating from software which is operative of a machine, which is at least in part symbolic of an identity, operational history, or performance characteristic of the machine.

Each machine such as outputs from an auditron port, either to a tech rep's laptop or a computer on a network, a set of binary "auditron data." The general concept of releasing auditron data onto a network port is known in the art. According to a preferred embodiment of the invention, however, this raw auditron data from a machine is of a specific format, readily creatable through common programming techniques applied to software within the machine 10. This flexible format places the binary auditron data in such an arrangement that can be parsed in a certain way as will be explained below.

According to the illustrated embodiments of the invention, the raw auditron data output from a machine is arranged so that initial sets of bytes of the data from the machine are assigned specific meanings, and then the bytes having specific meanings are followed by binary data which. In the particular embodiment shown, the first four bytes from machine 10 at an auditron download represent a number which is assigned a value depending on the data type of the following data. For example, one 4-byte number could indicate that the following data is boulean; other 4-byte numbers could indicate that the data represents integers, floating-variable data, or string variables. The next four bytes in the auditron data represent a number related to the overall length of the auditron data in that particular download; this number is of course useful for finding when the particular auditron data download ends, so that any subsequent auditron data from the machine is identified as belonging to another auditron data download.

Further structured sets of data in the binary auditron data include four bytes associated with a "process ID" which is a number which relates to which of a plurality of possible function calls is being returned in the particular auditron data download. This function is useful in situations where end users, tech reps, or systems administrators are each given access to different sets of auditron data. For example, the same machine may be able to download different sets of relevant auditron data which would be useful respectively to an end user, a systems administrator, or a tech rep. Each of these different types of auditron data sets would be identified by the number in the process ID data. Similarly, the following four bytes and the binary auditron data, called "parameter ID," may relate to special ID's which vary depending on the type of user (end user, tech rep, systems administrator) accessing a particular machine 10.

Following the first sixteen bytes of auditron data (in the illustrated embodiment), there follows an open-ended, unstructured set of binary data, which represents the actual auditron data for the particular auditron data download. In this data are numbers representative of, for example, accumulated copy count, the machine's serial number, etc. Thus, with reference to the claims hereinbelow, the auditron data emitted by the machine 10 includes a "structured" portion, in which the digits therein are assigned meanings depending on their position relative to the beginning of the data (e.g., the first four bytes hold a number symbolic of the data type, the second four bytes hold a number symbolic of the data length, etc.), and an "unstructured" portion.

According to the present invention, the auditron data, only the beginning of which is assigned a specific structure, is sent to a program called a "data parser" 30, at least part of which dwells on a particular computer 20. The function of data parser 30 is to use the structured data at the beginning of the auditron data (i.e., the first 16 bytes of auditron data in the illustrated embodiment) as instructions to parse the following unstructured data into a meaningful format. For example, consider a case in which a set of auditron data suitable for an end user, comprises the following sets of values:

Account No.
PIN
Number of Prints Left
Time Stamp

The actual values corresponding to the above parameters will be the substance of the unstructured portion of the auditron data. Simultaneously, the auditron data from the same machine 10 suitable for a systems administrator may include values relating to the following:

Account No.
PIN
Current print count
Average number of prints per day
Prints left for account X
Prints left for account Y
Prints left for account Z
Time stamp Clearly, whether the particular auditron data is intended for the end user or the systems administrator will affect the overall length of the unstructured portion of the auditron data in the download, and further the meaning of individual contiguous sets of binary data in the unstructured portion of the auditron data. The purpose of the data parser is to read the relevant part of the fixed portion of the auditron data, in this case the process ID, and then use the process ID data to interpret, or parse, the open-ended data at the end of the download so that numbers (subsets of digits) within the unstructured portion of the data are matched up with their intended meanings. For instance, if the process ID is read by the data parser 30 and identified as end-user auditron data, the four different parameters listed above for end-user auditron data would be identified by the data parser 30 from the unstructured portion of the auditron data as follows:

| Account No.: | first 4 bytes of unstructured data | |
| --- | --- | --- |
| PIN: | $5^{th}$ byte | " |
| Number of Prints Left: | $6^{th}$ byte | " |
| Time Stamp: | $7^{th}$–$11^{th}$ bytes | " |

If the process ID is read by the data parser 30 and identified as systems administrator auditron data, the eight different parameters listed above for systems administrator auditron data can be identified by the data parser 30 from the unstructured portion of the data as follows:

| Account No.: | first 4 bytes of unstructured data | |
| --- | --- | --- |
| PIN: | $5^{th}$ byte | " |
| Current print count: | $6^{th}$–$9^{th}$ bytes | " |
| Average number of prints per day: | $10^{th}$–$13^{th}$ bytes | " |
| Prints left for account X: | $14^{th}$–$18^{th}$ bytes | " |
| Prints left for account Y: | $19^{th}$–$22^{nd}$ bytes | " |
| Prints left for account Z: | $23^{rd}$–$27^{th}$ bytes | " |
| Time stamp: | $28^{th}$–$32^{nd}$ bytes | " |

Once the data parser 30 recognizes, from the process ID or equivalent data, how to parse the open-ended variable portion of the auditron data, the binary data and the variable data can thus be converted to a set of discrete numbers, which would be in a particular order, this order corresponding to the order of the particular kind of auditron data. These discrete numbers can then be placed in a structure, indicated as 32, into which is placed a set of numbers, each number corresponding to one of the parameters such as shown above. In the present example, auditron data for an end user would have four numbers while auditron data for a systems administrator would have eight numbers (i.e., the same number of numbers as there are parameters).

The numbers that are held in structure 32 are not yet assigned specific meanings. In order to assign meanings (such as in the above lists of parameters) to numbers within structure 32, the numbers within structure 32 are then sent to a program called a "template" indicated as 34. The template accepts the numbers, and by virtue of the position of each number in a set within structure 32, will assign a predetermined meaning to each number; e.g. for a "systems administrator" template, the first number will be assigned the meaning of "account number," and the fifth number "Prints left before replacement of account X," and so forth. There would of course be a different template, holding four numbers, for use when the auditron data is identified as end-user data. Because the data parser 30 will have recognized what type of parameters are described by the variable data in the auditron data, the data parser 30 can thus be used to determine which template should be used for which set of numbers. String variables associated with each number position in template 34, giving meanings to each set of numbers in the template 34, can thus be used as "column headings"(or, of course, an equivalent in a given spreadsheet program) when the numbers are placed in a chart.

The numbers placed in template 34, and string variables from template 34 which can be used as column headings, can be readily placed in a form which can be merged into a commercial spreadsheet program such as Microsoft® Excel™. It is also a simple matter, using such commercial spreadsheet programs, to combine the template data for a plurality of machines into a single spreadsheet, such as by using Microsoft® Access™. In this way, auditron data from one or a plurality of copiers or printers can be directly placed into a spreadsheet program which in turn can be updated which every download of auditron data from a machine on a network.

By allowing auditron data emitted from a particular machine to be placed in a format suitable for a standard spreadsheet program, the auditron data from a large number of machines 10, such as on the network, can be easily accumulated, using functions within programs such as Excel, to create easily-printable reports. Further, easy merging of auditron data to commercial spreadsheet programs allows the user to exploit mathematical processes, such as averaging and so forth, inherent in the commercial spreadsheet programs on the auditron data from a large number of machines, essentially in real time.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method of collecting auditron data from a machine, comprising the steps of:

the machine outputting auditron data in a format including a structured portion in which digits therein are assigned meanings depending on their position relative to a beginning of the auditron data, and an unstructured portion, the structured portion including a code therein;

interpreting the code as an instruction to parse digits in the unstructured portion in a predetermined manner, thereby interpreting the digits in the unstructured portion as a set of discrete numbers; and entering the discrete numbers into a template, thereby assigning meanings to each of the discrete numbers.

2. The method of claim 1, wherein the interpreting step includes the steps of if the code is a first number, interpreting the code as an instruction to parse digits in the unstructured portion in a first predetermined manner, thereby interpreting the digits in the unstructured portion as a set of discrete numbers;

if the code is a second number different from the first number, interpreting the code as an instruction to parse digits in the unstructured portion in a second predetermined manner different from the first manner.

3. The method of claim 2, wherein the entering step includes the steps of if the code is the first number, entering the discrete numbers into a first template, thereby assigning a first set meanings to each of the discrete numbers; and if the code is the second number, entering the discrete numbers into a second template, thereby assigning a second set of meanings to each of the discrete numbers.

4. The method of claim 1, further comprising transferring the discrete numbers to a spreadsheet program.

5. The method of claim 4, further comprising assigning column headings to columns in the spreadsheet program according to the meanings associated with the template.

* * * * *